United States Patent [19]

Roy

[11] 3,836,386

[45] Sept. 17, 1974

[54] COATING OF GLASSWARE TO IMPROVE ITS ABRASION RESISTANCE

[75] Inventor: Gerald L. Roy, Lancaster, Pa.

[73] Assignee: Kerr Glass Manufacturing Corporation, Los Angeles, Calif.

[22] Filed: Dec. 28, 1971

[21] Appl. No.: 213,155

Related U.S. Application Data

[63] Continuation-in-part of Ser. No. 15,947, March 2, 1970, abandoned.

[52] U.S. Cl................ 117/72, 117/94, 117/124 E, 215/DIG. 6, 260/DIG. 31
[51] Int. Cl... B32b 17/06, C03c 17/22, C03c 17/32
[58] Field of Search........ 117/124 E, 72, 124 T, 94; 260/DIG. 31; 215/DIG. 6

[56] References Cited
UNITED STATES PATENTS

| | | | |
|---|---|---|---|
| 3,079,358 | 2/1963 | Uelzmann | 117/124 E |
| 3,264,272 | 8/1966 | Rees | 117/128 |
| 3,321,819 | 5/1967 | Walter | 117/102 R |
| 3,338,739 | 8/1967 | Rees | 117/138.8 |
| 3,415,673 | 12/1968 | Clock | 117/72 |
| 3,420,693 | 1/1969 | Scholes | 117/94 |
| 3,441,424 | 4/1969 | Bolgiano | 117/72 |
| 3,472,825 | 10/1969 | Walter | 117/142 |
| 3,487,035 | 12/1969 | Bogart | 117/94 |
| 3,498,825 | 3/1970 | Wiens | 117/94 |
| 3,554,787 | 1/1971 | Plymale | 117/124 E |
| 3,661,628 | 5/1972 | Marsden | 117/72 |

*Primary Examiner*—William D. Martin
*Assistant Examiner*—William H. Schmidt
*Attorney, Agent, or Firm*—Fitch, Even, Tabin & Luedeka

[57] ABSTRACT

Glassware is rendered abrasion resistant by applying a first coating of a metal oxide to the glassware followed by a coating of an ionomeric copolymer.

12 Claims, No Drawings

COATING OF GLASSWARE TO IMPROVE ITS ABRASION RESISTANCE

This application is a continuation-in-part of copending application Ser. No. 15,947, filed Mar. 2, 1970 and now abandoned.

The present invention relates generally to coating of glassware to provide abrasion resistance. More particularly, it relates to coating of glassware with polymeric materials to impart improved abrasion resistance thereto.

Glassware, particularly glassware intended for use in high speed automatic equipment for filling, sealing, cartoning and the like, is subjected to a great deal of abrasion and impact. Such abrasion and impact often result in breakage of the glassware, and such breakage can be very costly in terms of machine downtime. Various means have been utilized to lessen the effect of abrasion and impact on glassware, usually by coating the glassware with some sort of protective agent.

For example, it has been known to coat glassware with a polysiloxane coating. Such polysiloxane coatings impart lubricity to the surface of the glass, thereby decreasing the effect of abrasion and also decreasing breakage due to impact. However, polysiloxane coatings are disadvantageous in that they make it difficult to affix labels to the glassware.

Other polymeric materials have also been used to provide a protective coating on glassware. Polyethylene has been applied to glassware by spraying on an aqueous dispersion of polyethylene. This also provides protection from abrasion and impact.

Another coating system which has been known and used deposits a metal oxide coating on the surface of the glassware, usually a coating of either tin oxide ($SnO_2$) or titanium dioxide ($TiO_2$), also called titania, although other metal oxide coatings are also known to provide desired abrasion resistance, e.g., zirconium and vanadium. Such metal oxide coatings are usually applied at the hot end of the glassware manufacturing operation. After forming and prior to entrance into the annealing lehr the hot glassware is passed through a region in which vapors or a mist of stannic chloride, titanium tetrachloride, or other pyrolyzable tin or titanium compounds are present. A small quantity of vapor or mist is deposited on the surface of the glassware, and as a result of the elevated temperature of the glassware, the pyrolyzable tin or titanium compound is oxidized to provide a coating of either tin oxide or titanium dioxide. The coating is present on the glassware in sufficiently small quantities that it does not result in a visible coating. Such metal oxide coatings also improve the abrasion resistance of glassware.

It has also been known to utilize combined coatings of a metal oxide and a polymeric coating. In such cases, the metal oxide coating is applied as previously described, and the polymeric coating is applied at the cold end of the lehr. Such combined coatings sometimes result in advantages not provided by the individual coatings.

It is an object of the present invention to provide an improved coating for glassware and other glass articles, and the resultant glassware and glass articles. It is a further object of the present invention to provide an improved polymeric coating composition for coating glassware and other glass articles. Other objects and advantages of the invention will become apparent from the following detailed description and claims.

Generally, in accordance with the present invention, glassware is coated with an organic polymer comprising an ionomeric polymer and, more particularly, comprising a hydrocarbon polymer containing acid groups which are reacted or neutralized to various extents with an ionizable metal. The ionomeric polymer may be applied directly to the surface of the glassware, or it may be applied in combination with a metal oxide coating of the type previously described.

Ionomeric polymers are described in a series of articles published in American Chemical Society Polymer Preprints; Volume 6, No. 1, (Apr., 1965) pages 287–303, Volume 8, No. 2 (Sept., 1967) pages 1130–1137, and Volume 9, No. 1, (Apr., 1968) pages 505–546. The ionomeric polymer described therein is a partially ionized copolymer of ethylene and methacrylic acid. The methacrylic acid component of the ionomeric polymer provides carboxylic groups which are capable of further reaction, and which are particularly suitable for reaction or bonding with the hydroxyl groups of glassware surfaces. The structure of such an ionomeric polymer in which the positive ion is sodium ion may be represented schematically as:

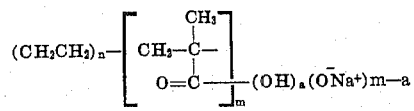

Ionomeric polymers are also described in detail in U.S. Letters Patent No. 3,264,272 as being a polymer of an α-olefin having the general formula $RCH=CH_2$ where R is a radical selected from the class consisting of hydrogen and alkyl radicals having from one to eight carbon atoms, the olefin content of said polymer being at least 50 mol percent based on the polymer, and an α,β-ethylenically unsaturated carboxylic acid having 1 or 2 carboxylic acid groups. Further, in accordance with the disclosure of that patent the concentration of acidic monomer in the copolymer is from 0.2 mol percent to 25 mol percent, and preferably from 1 to 10 mol percent. The molecular weight of the copolymer is such as to provide a melt index of 0.1 to 1,000 g. per 10 minutes, and preferably 1 to 100 g. per 10 minutes (ASTM–D–1238–57T). At least 10 percent, and preferably between 50 and 80 percent of the acid groups are neutralized or reacted with the metal ion.

Metal ions suitable for forming the ionomeric polymer are listed in the aforementioned Rees patent. Suitable monovalent metal ions, as set forth in the aforementioned Rees patent, are $Na^+$, $K^+$, $Li^+$, $Cs^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$. The preferred metal ions are the alkali metal ions, $Na^+$, $K^+$, $Li^+$ and $Cs^+$. The term "ionomeric polymer" as used herein refers to a polymer having one or more of the metal ions set forth in this paragraph.

Ionomeric polymers suitable for the practice of the present invention are available from I. E. du Pont de Nemours & Company under the trade designation Elvax D ionomer resin dispersions.

In accordance with the present invention, the ionomeric polymer may be applied to pristine glassware as it emerges from the cold end of the lehr by spraying the glassware with an aqueous dispersion of the ionomeric polymer, followed by drying of the aqueous carrier. The ionomeric polymer coating may be further cured or cross-linked by heating to about 300°F or higher. However, it has been found that improved resistance to abrasion is obtained when the ionomeric polymer is not further cured or cross-linked. Nevertheless, under certain circumstances and conditions, it may be advantageous to cure the ionomeric polymer after application to the glassware.

Alternatively, and preferably in accordance with the present invention, the ionomeric polymer may be applied to glassware which has previously been coated with an inorganic metal oxide coating such as tin oxide or titanium dioxide. Typically, the inorganic coating will be applied at the hot end of the lehr and the ionomeric polymer may be applied by spraying the glassware at the cold end of the lehr to thereby deposit the ionomeric polymer on top of the previously deposited inorganic coating.

The ionomeric polymer is preferably dispersed in water, and the resultant dispersion is sprayed on the glassware. The ionomeric polymer concentration in the dispersion is sufficiently low, i.e., 0.5 percent by weight or less, and preferably 0.1 percent by weight or less, that the ionomeric polymer is distributed on the surface of the glassware in the form of discrete particles rather than a continuous film covering the entire glassware surface. It has been found that the provision of a continuous film of the ionomeric polymer actually may be undesirable because it can result in poor label adhesion.

Glassware coated in accordance with the present invention has surprisingly improved resistance to abrasion in comparison with previously known coatings.

of the lehr with a tin oxide coating, and the same bottles were coated at the cold end of the lehr with the ionomeric polymer of the present invention. The ionomeric polymer was an interpolymer of ethylene and methacrylic acid with part of the acid groups having been reacted or neutralized with an alkali metal, and is commercially available from E. I. du Pont de Nemours & Company under the trade designation Elvax D-1220. The ionomeric polymer was applied from aqueous dispersions in which the ionomeric polymer was present at levels of 0.05 percent and 0.025 percent by weight.

A set of control bottles was also made in which the same bottles were coated at the cold end of the lehr with a polyethylene resin. The polyethylene resin was applied as an aqueous dispersion in which the polyethylene was present at a level of 0.1 percent by weight, being twice and four times the concentration of the ionomeric resin dispersions.

A portion of the bottles coated in accordance with the present invention were held at a temperature above 300°F. to cure, i.e., further crosslink the ionomeric polymer coating, and the remaining bottles were held below 200°F. after coating so that substantially no further curing or cross-linking was effected.

The bottles were then subjected to a standard scratch test in which the force required to break through the coating material to the glass surface is measured. A force of greater than about 25 pounds indicates an acceptable coating. Scratch tests were carried out on the bottles as received, and also after the bottles had been autoclaved for one hour at 250°F. Scratch tests were also performed on another set of bottles which had been soaked for 50 minutes at 150°F. in an aqueous solution of 4.5 percent sodium hydroxide and 0.5 percent trisodium phosphate. The results of the scratch tests are set forth in Table 1:

Table 1

| Film | Cold End Coating Post-Treatment | As Received | Scratch Test Result After Autoclaving | After Caustic |
|---|---|---|---|---|
| 0.05% Ionomer | Crosslinked | 80 lbs | 80 lbs | 80 lbs |
|  | Uncrosslinked | 80 lbs | 80 lbs | 80 lbs |
| 0.025% Ionomer | Crosslinked | 80 lbs | 80 lbs | 80 lbs |
|  | Uncrosslinked | 80 lbs | 80 lbs | 80 lbs |
| 0.1% Polyethylene | — | 80 lbs | 20 lbs | 40 lbs |

Scratch resistance of the glassware is equal to or better than the scratch resistance of glassware coated with prior art coatings even though the ionomeric polymer coating of the present invention may be applied from aqueous dispersions containing only half the concentration of polymer used in the prior art dispersions, such as a polyethylene dispersion. Moreover, glassware coated in accordance with the present invention retains its resistance to abrasion even after exposure to autoclave conditions and when exposed to alkaline treatment. Removal torque of closures from glassware coated in accordance with the present invention is also substantially improved over the prior art coatings. Label adhesion to the coated glassware is satisfactory.

EXAMPLE I

As an example of the practice of the present invention, 12 ounce beer bottles were coated at the hot end It can be seen from Table 1 that the scratch resistance of bottles treated in accordance with the present invention was excellent. On the control bottles, the initial scratch resistance was also excellent, but fell off markedly after autoclaving and after caustic treatment, whereas bottles treated in accordance with the present invention retained excellent scratch resistance even after autoclaving and after caustic treatment.

EXAMPLE II

As a further example of the practice of the present invention, 5 ounce baby food jars were coated with a titanium dioxide coating at the hot end of the lehr, and thereafter were coated at the cold end of the lehr as in Example I with the ionomeric polymer of the present invention and with polyethylene as a control. The scratch resistance of the jars both as received and after autoclaving and caustic treatment were comparable to those set forth in Example I.

EXAMPLE III

Five ounce baby food jars coated in accordance with Example II were used to evaluate the torque required to remove closures from the jars. The torque required to remove the cap from the jar was measured after 5 days and 30 days with an Owens-Illinois torque meter. The results are set forth in Table 2:

Table 2

| Cold End Coating | | Removal Torques, in.-lb. | |
|---|---|---|---|
| Film | Post-Treatment | 5 Days | 30 Days |
| 0.025% Ionomer | Crosslinked | 18.8 | 20.6 |
|  | Uncrosslinked | 16.5 | 19.4 |
| 0.050% Ionomer | Crosslinked | 19.6 | 21.7 |
|  | Uncrosslinked | 12.6 | 16.2 |
| 0.1% Ionomer | Crosslinked | 21.4 | 23.8 |
|  | Uncrosslinked | 14.0 | 19.4 |
| 0.1% Polyethylene | — | 26.3 | 26.0 |

It will be seen from Table 2 that removal torque for the jars treated in accordance with the present invention was substantially lower in all cases than the removal torque required in accordance with the prior art polyethylene coating.

EXAMPLE IV

The label adhesion to glassware coated in accordance with the present invention was evaluated with four types of commercial label adhesives, namely, dextrine, casein, jelly gum, and Resyn adhesives. The tests were carried out on glassware which had been coated in accordance with Example I, applying the ionomeric polymer from an aqueous dispersion containing 0.05 percent ionomer. The ionomeric polymer was not further crosslinked or cured after application. Adhesion tests were made on the glassware as received, and after autoclaving and caustic treatment as in Example I. The adhesion test was carried out after six days at ambient conditions, followed by six days at 65°C. Adhesion to the glassware was satisfactory with all four of the commercial adhesives.

Various of the features of the present invention are set forth in the following claims.

What is claimed is:

1. A method for providing a protective coating for glassware to provide improved resistance to abrasion, which is retained after exposure of the glassware to autoclave conditions and after alkaline treatment, comprising, in combination, the steps of forming the glassware, providing a metal oxide coating on the glassware, thereafter depositing on the glassware an ionomeric polymer comprising a polymer of an $\alpha$-olefin and an $\alpha,\beta$-ethylenically unsaturated carboxylic acid, the olefin content of the polymer being at least 50 mol percent based on the polymer and the content of the ethylenically unsaturated carboxylic acid monomer being from 0.2 mol percent to 25 mol percent based on the polymer, between about 10 and about 80 percent of the carboxylic acid groups being neutralized with an ionizable metal, the ionomeric polymer being deposited on the metal oxide coating in discrete particles from an aqueous dispersion comprising 0.5 percent or less by weight of ionomeric polymer, and thereafter drying the aqueous carrier from the glassware.

2. The method of claim 1 in which the ionomeric polymer comprises an interpolymer of ethylene and methacrylic acid.

3. The method of claim 1 in which the metal oxide coating comprises tin oxide.

4. The method of claim 1 in which the metal oxide coating comprises titanium dioxide.

5. Glassware having improved resistance to abrasion which is retained after exposure of the glassware to autoclave conditions and after alkaline treatment, said glassware including a metal oxide coating on the glassware and an ionomeric polymer deposited over the metal oxide coating, said ionomeric polymer comprising a polymer of an $\alpha$-olefin and an $\alpha,\beta$-ethylenically unsaturated carboxylic acid, the olefin content of the polymer being at least 50 mol percent based on the polymer and the content of the ethylenically unsaturated carboxylic acid monomer being from 0.2 mol percent to 25 mol percent based on the polymer, between about 10 percent and about 80 percent of the carboxylic acid groups being neutralized with an ionizable metal, the ionomeric polymer being deposited on the metal oxide coating in discrete particles.

6. Glassware in accordance with claim 5 in which the ionomeric polymer comprises an interpolymer of ethylene and methacrylic acid.

7. Glassware in accordance with claim 5 in which the metal oxide coating is tin oxide.

8. Glassware in accordance with claim 5 in which the metal oxide coating is titanium dioxide.

9. The method of claim 1 wherein between 50 and 80 percent of the carboxylic acid groups are neutralized with an ionizable metal.

10. The method of claim 9 wherein the ionizable metal is an alkali metal.

11. Glassware in accordance with claim 5 wherein between 50 and 80 percent of the carboxylic acid groups are neutralized with an ionizable metal.

12. Glassware in accordance with claim 11 in which the ionizable metal is an alkali metal.

* * * * *